United States Patent [19]

Renner

[11] B 4,000,116
[45] Dec. 28, 1976

[54] PROCESS FOR THE MANUFACTURE OF POLYETHERS CONTAINING IONIC BONDS

[75] Inventor: Alfred Renner, Munchenstein, Switzerland

[73] Assignee: Ciba-Geigy Corporation, Ardsley, N.Y.

[22] Filed: Feb. 7, 1974

[21] Appl. No.: 440,633

[44] Published under the second Trial Voluntary Protest Program on February 10, 1976 as document No. B 440,633.

[30] Foreign Application Priority Data

Feb. 14, 1973 Switzerland .................. 2086/73

[52] U.S. Cl. .................. 260/47 EP; 210/24; 252/8.8; 260/2.1 R; 260/2.1 C; 260/2.5 EP; 260/47 EQ; 260/51.5; 260/47 UA; 260/830 TW; 260/834; 260/DIG. 6; 260/17 R; 427/13
[51] Int. Cl.² ........................... C08G 30/14
[58] Field of Search ........ 260/47 EP, 47 EN, 2.1 B, 260/2.1 C, 51.5, 826, 834, 2 BP, 839, 47 EQ, 830 TW, DIG. 17

[56] References Cited

UNITED STATES PATENTS

| | | | |
|---|---|---|---|
| 3,436,373 | 4/1969 | Cox et al. | 260/47 X |
| 3,462,382 | 8/1969 | Kolka | 260/51.5 X |
| 3,625,684 | 12/1971 | Poot et al. | 260/2 X |
| 3,790,606 | 2/1974 | Sellet | 260/51.5 X |

*Primary Examiner*—Harold D. Anderson
*Assistant Examiner*—T. Pertilla
*Attorney, Agent, or Firm*—Vincent J. Cavalieri

[57] ABSTRACT

The cross-linked macromolecular polyethers containing ionic bonds are obtained by reacting polyhydric phenols which contain amino groups (Mannich bases) with compounds which contain simultaneously epoxide groups and halogen atoms. An addition and a quaternization reaction occur. Optionally, it is possible to add simple organic halides to the reaction mixture. The adducts manufactured in this way have a reduced tendency to acquire a static charge and can be used with advantage in the textile and paper sectors.

25 Claims, No Drawings

PROCESS FOR THE MANUFACTURE OF POLYETHERS CONTAINING IONIC BONDS

Dialkylaminomethylphenols are easily obtainable by a Mannich reaction from phenols which possess at least one unsubstituted o- or p-position, formaldehyde and dialkylamines. Their use as curing agents and as curing accelerators for epoxide resins forms part of the state of the art and is disclosed in numerous publications. Their action as curing agents is based not only on the addition of phenolic hydroxyl to the epoxide group but, above all, on their ability, as tertiary amines, to initiate the cationic polymerisation of epoxide groups. The Mannich bases of phenols are also employed as accelerators of the curing reaction of epoxide resins with acid anhydrides, with polycarboxylic acids and with acid amides, for which purposes only small catalytic amounts are employed. In both types of this curing reaction of epoxide resins, macromolecular crosslinked structures are produced, synthesised exclusively from homopolar bonds.

There are, moreover, already a number of known process for the manufacture of polyquaternary products. In this connection, attention is drawn to British Pat. No. 652,830 and German Auslegeschrift No. 1,495,693.

It has been found that macromolecular isomeric crosslinked structures are obtained if Mannich bases of phenols, epoxide compounds containing halogen and, optionally, organic halogen compounds are reacted with one another. The crosslinked macromolecular substances synthesised in this way display, surprisingly, a completely different pattern of properties than do the conventional epoxide resins and are therefore also suitable for other end uses, for example as plastics having a reduced tendency to acquire a static charge, as lacquer raw materials for electrostatic and electrophoretic coating processes, as antistatic textile finishes, as auxiliaries for the paper industry, as ion exchange resins and as auxiliaries for the purification of effluents.

It is the task of the invention to provide cross-linked high polymers containing ionic bonds. This was achieved by reacting Mannich bases, which are obtained by Mannich reaction of phenols, which possess at least one unsubstituted o- or p-position, with formaldehyde and dialkylamines, with compounds which contain at least one Cl or Br or I atom bonded to a hydrocarbon radical and at the same time contain at least one 1,2-epoxide group, at temperatures of 20° to 200°C. The reaction can optionally be carried out in the presence of water or organic solvents and organic compounds which contain at least one Cl or Br or I atom bonded to a hydrocarbon radical can additionally be involved in the reaction.

Hence, the subject of the present invention is a process for the manufacture of crosslinked macromolecular polyethers containing ionic bonds, which is characterised in that polyhydric, mononuclear or polynuclear phenols (A), which possess, as substituents in the o- or p-positions to the OH groups, a total of at least 2 radicals of the formula I

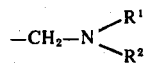 (I)

in which $R^1$ and $R^2$ are identical or different and denote a saturated or unsaturated hydrocarbon radical with 1 to 4 carbon atoms or together denote the morpholino radical (such phenols being Mannich bases), are reacted with compounds (B) which contain at least one Cl or Br or I atom bonded to a hydrocarbon radical and at least one epoxide group, with addition of the epoxide groups to the phenol groups and with quaternisation of the halogenated hydrocarbon radicals with the radicals of the formula I, and optionally with organic compounds (C) which contain at least one Cl or Br or I atom bonded to a hydrocarbon radical, with quaternization of the halogenated hydrocarbon radicals with the radicals of the formula I, optionally in the presence of water or organic solvents, at temperatures of 20° to 200°C.

As is known, a quaternization is understood as the combination of tertiary amino groups (in the present invention, the amino groups of the phenols) and carbonium ions, which in the present case result from the compounds (B) and optionally from the compounds (C).

In general, the process according to the invention which is followed is that the polyhydric mononuclear or polynuclear phenols (A), which contain at least two radicals of the formula I, are reacted with the compounds (B) and optionally with the organic compounds (C) in a ratio such that in the reaction mixture there are 0.5 to 2 epoxide groups per one phenolic group and 0.5 to 1.2 halogen atoms per one tertiary amino group of the formula I. In a preferred embodiment of the invention, phenolic hydroxyl and epoxide, on the one hand, and tertiary amine and halogen, on the other, are present in the equivalent ratio.

A preferred procedure of the invention is to reaction of the phenols (A) with the compounds (B). Polyquaternization is achieved even with B alone.

In all these conversions, the following reactions take place simultaneously:
1. The addition of the epoxide groups to the phenolic hydroxyl groups and
2. the quaternization of dialkylaminomethyl groups by the carbonium ion of the halogenoepoxide.

If a stoichiometric excess of epoxide over phenolic hydroxyl is present, it is also necessary to take into account the
3. cationic polymerization of epoxide groups.

The use of halogen compounds (C) is not obligatory but is advisable in those cases where, if the phenolic OH of the Mannich base is equivalent to the epoxide of the halogenoepoxide compound, a less than equivalent amount of ionic chlorine relative to tertiary nitrogen would be produced. This applies in the case of Mannich bases which contain more tertiary nitrogen atoms than phenolic OH groups in the molecule, such as, for example, in the case of 2,2',6,6'-tetrakis-dimethylaminomethyl-bisphenol A. In these cases the degree of quaternisation can be increased by reacting the excess tertiary nitrogen atoms with the compounds (C) which contain at least one halogen atom.

If, in a reaction mixture according to the invention, the epoxide groups are present in less than equivalent amount relative to the phenolic OH groups, this nonequivalence can be overcome by the addition of halogen-free normal epoxide compounds (D).

The relative rates of the reactions depend on the reactivity and the concentrations of the reactants. For example, heavier halogen atoms react more rapidly than light halogen atoms, and allyl halides and benzyl halides react more rapidly than alkyl halides. The reactivity of the phenolic hydroxyl groups in turn depends greatly on the spatial requirement of the dialkylaminomethyl groups which are in the ortho-position. The wide range of phenolic Mannich bases, of halogenoepoxides and optionally of halogen compounds and simple epoxide compounds however makes it possible to select systems of reactivity suited to the end use.

Observations indicate that the amine-catalysed hydroxyl-epoxide addition is the more rapid. Its heat of reaction is added to that of the ionic linking or crosslinking. In the case of reactive halogen compounds, for example of the allyl or benzyl type, this second amount of heat liberated is also considerable. Particularly when working in the absence of solvents or diluents it is necessary to take precautions to remove heat so as to avoid internal overheating of the mouldings.

Since this reaction gives infusible and insoluble substances and since the halogen employed can be quantitatively titrated argentometrically in the aqueous extract of the optionally comminuted moulding, it is assumed that quaternary ammonium ions and ether groups are the most important crosslinking elements of the macromolecular cross-linked structure in which the halogen ions can move in a cationic matrix.

Depending on the end use envisaged, the reaction is allowed to take place in bulk, in solution or in aqueous dispersion. If the crosslinking is to take place together with macroscopic moulding, solvents or diluents must in general be excluded. In dilute solutions, gels or precipitates of highly disperse polymers are obtained in some cases and these, after filtration and drying, give voluminous powders of large specific surface area.

In an aqueous medium, the reaction can be allowed to take place in the manner of a bead polymerization. For this purpose, protective colloids such as, for example, polyvinyl alcohol, methylcellulose, ethylcellulose, hydroxyethylcellulose or carboxymethylcellulose are frequently of value. The crosslinked addition polymer is obtained in the form of porous beads heavily swollen with water. Where the product is used as an ion exchanger, this character of the product is of particular value.

In manufacturing, according to known processes, the Mannich bases used as starting products for the process according to the invention, divalent phenols such as, for example, resorcinol, hydroquinone and bisphenol A, are preferably used as starting materials. Particularly suitable Mannich bases are binuclear phenols of the formula II

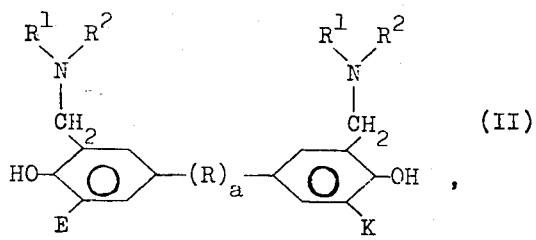

wherein E and K are the same or different and represent either hydrogen or the radical of the formula I, in which a is 0 or 1 and in which R represents one of the divalent radicals

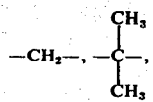

—SO—, —SO$_2$— or —CO—. Examples of such phenols of the formula II are 2,2',6,6'-tetrakis(dimethylaminomethyl)bisphenol A, 2,2'-bis(dimethylamino)-4,4'-dihydroxydiphenyl and 2,2',6-trismorpholinomethyldihydroxydiphenylsulphone.

The following substances are examples of compounds (B) which can be used according to the invention and which contain at least one Cl or Br or I atom bonded to a hydrocarbon radical and in addition contain at least one epoxide group:
1. Halogenoalkyl glycidyl ethers,
2. epoxyhalogenoalkanes,
3. polyepihalogenohydrins which contain at least one terminal epoxide group and have a degree of polymerization of about 3 to 500,
4. substances which have been manufactured by addition reaction of monohydric or polyhydric alcohols or phenols with more than stoichiometric amounts of epihalogenohydrin in the presence of Friedel-Crafts catalysts and subsequent dehydrohalogenation and which have the general formula (III)

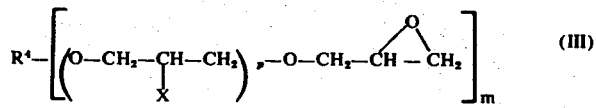

in which R$^4$ denotes a m-valent aliphatic or aromatic radical, X denotes Cl, Br or I, m denotes an integer from 1 to 6 and p denotes an integer from 1 to 20.

The following substances, for instance, should be mentioned as special examples of such compounds (B): Epichlorohydrin, epibromohydrin, epiiodohydrin, 2-methylepichlorohydrin, 2-methylepibromohydrin, 1,4-dichloro-2-epoxybutane, 5-epoxy-1-bromo-n-hexane, 2-chloroethyl glycidyl ether, 2-(chloromethoxy)-ethyl glycidyl ether, 2-(chloroethoxy)-ethyl glycidyl ether, a condensation product of pentaerythritol and epichlorohydrin (condensation in the presence of SnCl$_4$ and with an excess of epichlorohydrin) and a condensation product of 1,3-dichloroisopropanol and epichlorohydrin.

As organic compounds (C) according to the invention it is in particular possible to use low molecular or high molecular compounds containing Cl or Br atoms. Fluorine compounds are in general insufficiently reactive towards Mannich bases and therefore do not belong within the scope of the present invention. Examples of operative halogen compounds are: Simple alkyl, alkenyl or aralkyl chlorides, bromides or iodides, such as methyl bromide, methyl iodide, ethyl bromide, allyl chloride, allyl bromide, butyl chloride, butyl bromide, benzyl chloride and benzyl bromide. These simple compounds should not contain more than 8 carbon atoms.

However, the use of dihalogen or polyhalogen compounds is preferred since these not only increase the ionic concentration but also the density of crosslinking, which is of advantage for many end uses.

Examples of such halogen compounds to be employed preferentially are: 1,2-Dichloroethane, 1,2-dibromoethane, 1,3-chlorobromopropane, 1,4-dichlorobutane, 1,4-dibromobutane, 1,4-dichlorobutene-2, 1,6-dichlorohexane, 1,6-dibromohexane, 1,8-dibromooctane, 1,12-dichlorododecane, o-, m- and p-xylylene chloride, cyanuric chloride, 2,2'-dichlorodiethyl ether, polyepichlorohydrin and polyaddition products, containing chlorine, of polyhydric alcohols and epichlorohydrin.

The following halogen-free epoxide compounds (D) are examples of compounds which can be used to bring about the equivalence with regard to the phenolic OH groups and the epoxide groups in the reaction mixture: Epoxidised cycloolefines, the glycidyl esters of optionally hydrogenated phthalic acids and heterocyclic glycidyl compounds such as glycidyl hydantoins, glycidyl uracils and triglycidyl isocyanurate. In practice, all commercial resins supplied for example, by CIBA-GEIGY AG under the tradename ARALDIT can be employed for the disclosed purpose. The diglycidyl ethers which are derived from bisphenol A, and diglycidyl ethers of 1,4-butanediol, as well as tetraglycidyl ethers of pentaerythritol, are particularly suitable.

The invention further relates to the crosslinked macromolecular polyethers which can be manufactured by the process according to the invention and contain ionic bonds. They consist of the cationic matrix which contains the mobile halogen ions. The matrix essentially has a crosslinked structure. This crosslinked structure can, in the simple case of the use of epichlorohydrin as the compound (B), be illustrated approximately by the formula (IV)

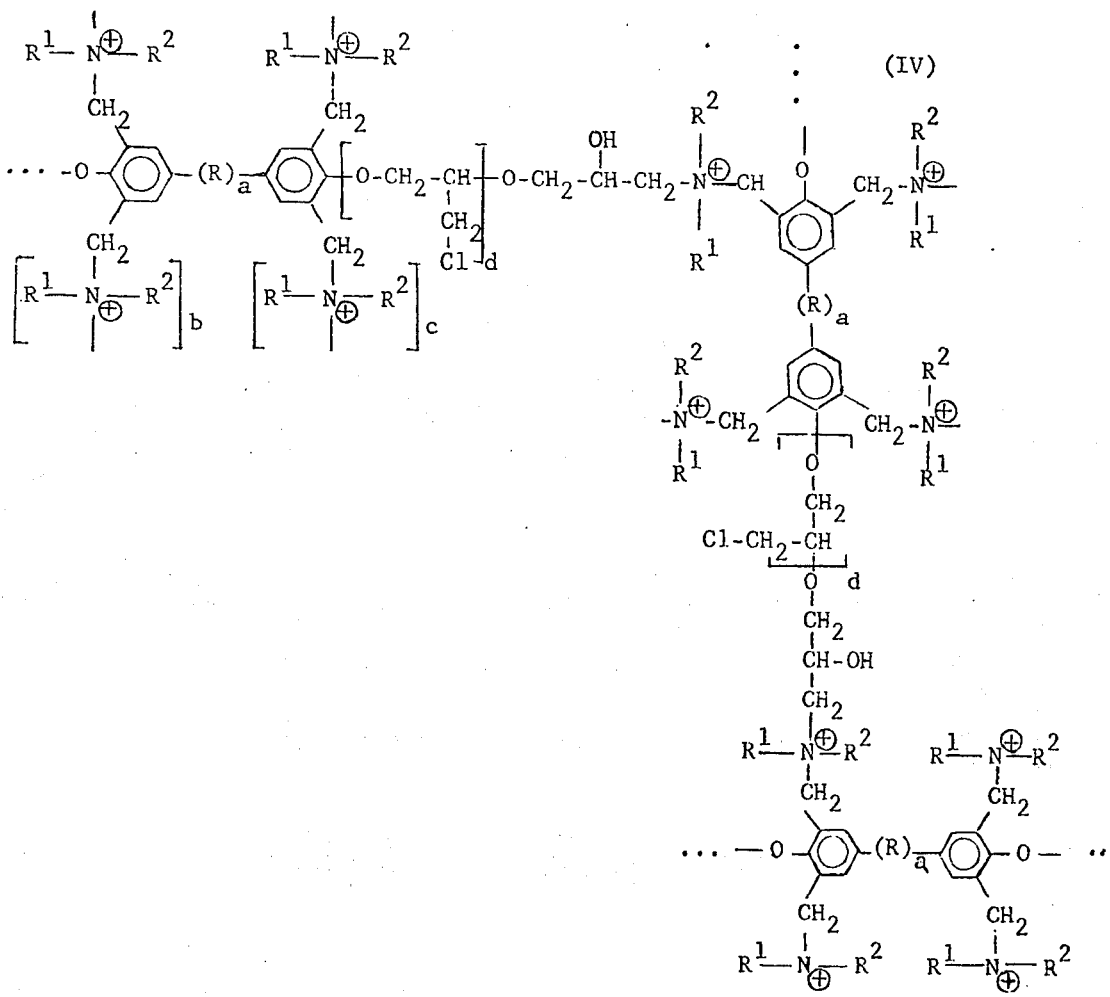

In the formula IV:
R denotes a divalent radical, for example —$CH_2$—,

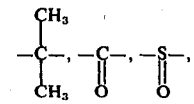

—$SO_2$— and the like, $R^1$ and $R^2$ denote saturated or unsaturated hydrocarbon radicals $C_1$–$C_4$ or together denote —$CH_2.CH_2.O.CH_2.CH_2$—, and can be identical or different, $a$, $b$ and $c$ are identical or different and denote 0 or 1, and $d = 0$ in the case of an excess of phenolic hydroxyl over epoxide, ⩽0.5 in the case of equivalents and $>0$ ⩽5 in the case of a stoichiometric excess of epoxide.

The crosslinked polyethers according to the invention are mechanically stable and at the same time can be swollen in water. The cationomeric crosslinked structure and the mobile anions make them suitable for use as ion exchangers. The ion exchange capacity is between 2 and 10 milliequivalent/g.

Because of their ionic charges, the polyethers according to the invention can be used, for example, as plastics having a reduced tendency to acquire a static charge, as antistatic textile finishes, as auxiliaries for the paper industry and as auxiliaries for effluent purification.

In the latter case, polyethers which are precipitated from dilute solutions are particularly suitable. In this case it is not only the ionic charge but the large specific surface area which has a favourable effect.

The examples which follow are intended further to illustrate the invention. In these examples, "parts" are to be understood as parts by weight. The relationship of parts by weight to parts by volume is as of the kilogram to the liter.

EXAMPLE 1 a. Manufacture of 2,2′,6,6′-tetrakis(dimethylaminomethyl) bisphenol A

912 Parts of bisphenol A and 1,980 parts of 40% strength aqueous dimethylamine solution are vigorously stirred together. 1,330 parts of 37% strength aqueous formaldehyde solution are added dropwise to this suspension. The temperature is allowed to rise to 50°C and is kept thereat by means of external cooling. The bisphenol gradually dissolves and the mixture then turns cloudy, after which an oily phase separates out.

After dropwise addition of the formaldehyde solution, the temperature is raised to 80°C and kept thereat overnight, whilst stirring. All volatile components are then distilled off in a rotary evaporator at 150°C and 15 mm Hg. A viscous resin remains, which on standing slowly crystallizes after a prolonged period.

Yield: 1,730 parts, corresponding to 94.8% of theory.

|  | Calculated for $C_{27}H_{44}N_4O_2$ | Found |
|---|---|---|
| % C: | 71.05 | 71.20 |
| % H: | 9.72 | 9.80 |
| % N: | 12.28 | 12.28 |
| Molecular weight: | 456 | 453 |

A sample precipitated from n-heptane melts between 85° and 85.5°C.

b. Manufacture of a polyether containing ionic bonds 50.0 Parts of the Mannich base manufactured according to 1a and 61.3 parts of 2-chloroethyl glycidyl ether (boiling point$_{18}$=96°C; % Cl = 25.44, calculated: 25.96) are homogeneously mixed at 60°–70°C and the mixture is poured into moulds of size 150×150×4 mm³ and allowed to gel at the same temperature. After a curing cycle of 2 hours at 100°C and 12 hours at 140°C a flawless light brown tough and hard plastic sheet is obtained. The following properties are measured on test specimens cut out of this sheet:

Flexural strength (VSM 77,103): 7.45 kg/cm³

-continued

Impact strength (VSM 77,105): 8.63 kg/cm
Shore hardness D (ISO R 868): 81
Heat distortion point (ISO R 75): 104°C Titration, with silver nitrate solution, of the water extract of a powdered sample of the ionomer shows 14.15% chloride ions (calculated: 14.02%).

EXAMPLES 2 TO 4 a. Manufacture of a condensation product, containing chlorine, from pentaerythritol and epichlorohydrin 136 Parts of absolutely dry, finely ground pentaerythritol are suspended in 400 parts of anhydrous dioxane and warmed to 80°C whilst stirring. 2 Parts by volume of tin tetrachloride are added, the mixture is warmed to the boil and 1,110 parts of epichlorohydrin are added dropwise over the course of 3 hours. During the addition, the reaction mixture must constantly boil under reflux. Each time a quarter of the amount of epichlorohydrin has been added, further catalyst doses of 2 ml are added.

The mixture is allowed to react for a further 3 hours at 120°C and the dioxane is then distilled off. 800 Parts of toluene are added and this is distilled under a pressure of 100 mm Hg through a Hahn attachment, to remove the water. 416 parts of 30% strength aqueous sodium hydroxide solution are added dropwise over the course of 3.5 hours to this solution boiling under reduced pressure. The azeotropic distillation is controlled, by adjusting the pressure and heating the reaction flask, in such a way that the sump temperature remains between 60° and 65°C and both the water introduced with the sodium hydroxide solution and the water formed in the reaction are continuously separated off. When all the water has been separated off, the vacuum is released, the mixture is returned to room temperature and neutralised, and the sodium chloride formed in the reaction is washed out with 1,000 parts of water. After careful phase separation, the toluene is distilled off at 15 mm Hg until a sump temperature of 130°C has been reached, 1,015 parts of a light brown liquid resin having a viscosity of 3,600 cP at 25°C, a chlorine content of 23.57% and an epoxide equivalent weight of 553 are obtained.

b. Manufacture of polyethers containing ionic bonds

The condensation product manufactured according to Example 2a is reacted in 3 experiments with the Mannich base (according to Example 1a), using the amounts and reaction conditions indicated in the table. In one of these experiments a liquid bisphenol A epoxide resin (reaction product of bisphenol A with epichlorohydrin, epoxide content: 5.3 epoxide equivalents/kg of resin) is additionally reacted. In all cases, all the reactants are reacted conjointly, that is to say the initial reaction mixture contains all the reactants. In other respects, the mixtures are processed, and the resulting materials tested, in accordance with Example 1b. The experimental results are also shown in the table. Tough, transparent sheets can be pressed from the end products according to Examples 2b and 4b.

| Example | 2 | 3 | 4 |
|---|---|---|---|
| Mannich base according to Example 1a | 24.8 | 35.3 | 45.6 |

| Example | 2 | 3 | 4 |
|---|---|---|---|
| Resin according to Example 2a | 60.0 | 46.7 | 60.0 |
| Bisphenol-A-epoxide resin | — | 13.3 | — |
| Gelling (isothermal) | | 70°C | |
| Curing | | 24 hrs 140°C | |
| % Cl⁻ | 7.9 | 7,4 | 9.6 |
| % total Cl | 15.1 | 11.1 | 12.4 |
| Flexural strength (kg/mm²) | 9.2 | 8.9 | 7.7 |
| Impact strength (kg/cm) | 7.2 | 5.5 | 4.8 |
| Shore hardness D | 84 | 82 | 80 |
| Heat distortion point (°C) | 110 | 128 | 123 |

EXAMPLE 5

Manufacture of an anion exchange resin

To form the Mannich base in situ, 114 parts of bisphenol A, 247.5 parts of aqueous 40% strength dimethylamine solution and 166 parts of 30% strength aqueous formaldehyde solution are allowed to pre-react overnight at 20°–25°C. 1,000 parts of water, in which 1.53 parts of polyvinyl alcohol are dissolved, are added to the two-phase system, which is warmed to 80°C. The mixture is stirred at a speed such that the oily resinous phase is broken up into droplets of approx. 1 mm. 92.5 parts of epichlorohydrin are added dropwise over the course of 70 minutes and 65 parts of 1,3-dichloroisopropanol are added dropwise over the course of a further 70 minutes at 80°C.

The mixture is cooled to room temperature and filtration gives 500 parts of infusible bead condensate having the following properties:

| Solids content | : | 22.0% |
|---|---|---|
| Anion exchange capacity | *): | 2.045 milliequivalent/g |
| Chloride ions | *): | 12.65% |
| Nitrogen | *): | 5.38% |
| Degree of quaternisation | *): | 96% |

*) Determined on the dried sample.

Examples 6 to 10

A. Manufacture of the starting products a. Mannich base of the formula IV

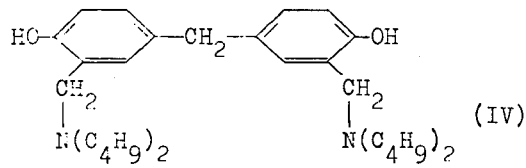

(IV)

100 parts of 4,4'-dihydroxydiphenylmethane, 85.1 parts of aqueous 37% formaldehyde solution, and 129 parts of dibutylamine are reacted as described in Example 1a.

After hydroextraction at 17 Torr and 150°C, there are obtained 233 parts of a brown liquid resin with a viscosity of 26'800 cP at 25°C.

| Yield | 96,7% of theory | |
|---|---|---|
| Analysis: | calc.on | found |
| | C₃₁H₄₈N₂O₂: | |
| % C: | 77,13 | 77,32 |
| % H: | 10,44 | 10,34 |
| % N: | 5,80 | 5,55 |
| MG: | 482,73 | 506 | b. Mannich base of the formula V

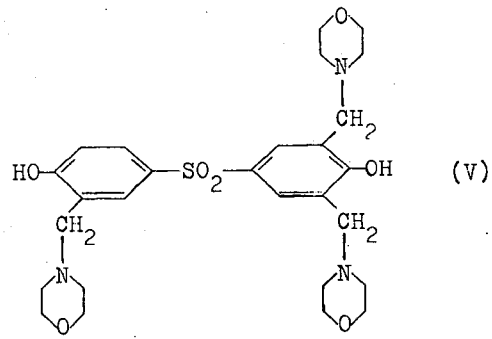

(V)

125 parts of 4,4'-dihydroxydiphenylsulphone, 127.6 parts of aqueous 37% formaldehyde solution, and 130.5 parts of morpholine are reacted as described in Example 1a to give 233 parts of a brown, solid resin.

| Yield | 85,3 % of theory | |
|---|---|---|
| Analysis: | calc.on | found |
| | C₂₇H₃₇O₇N₃S: | |
| % C: | 59,21 | 59,07 |
| % H: | 6,80 | 7,08 |
| % N: | 7,67 | 8,06 |
| % S: | 5,85 | 5,31 |
| MG: | 547,67 | 555 | c. Chlorine-containing epoxide compound (as compound B) 136 parts of pentaerythritol are suspended in 400 parts of dioxane, 3 parts by volume of tin tetrachloride are added and the mixture is heated to the boil. Then 814 parts of epichlorohydrin are added and the batch is heated for 15 hours to the boil. The epoxide value of the reaction mixture falls to 0.05 val/kg. Thereafter 400 parts of toluene are added and distillation is effected at 70–80 Torr via a Hahn attachment. Over the course of 2 hours 352 parts of 50% aqueous NaOH are added dropwise while 255 parts of H₂O are removed azeotropically. Precipitated sodium chloride is filtered off and the filtrate is washed with 100 parts of a 50% NaH₂PO₄ solution and clarified with activated charcoal. The solvent is distilled off to yield 564 parts (85.2 % of theory) of a dark brown liquid with a viscosity of 2100 cP at 25°C. The epoxide equivalent weight is 220, the chlorine equivalent weight 183, corresponding to a chlorine content of 19.47%.

d. Chlorine-containing epoxide resin (as compound B) 220 parts of 2,2',6,6'-tetramethylol-cyclohexanol 1 in 400 parts of dioxane, 3 parts by volume of tin tetrachloride are added and the mixture is heated to the boil. Then 925 parts of epichlorohydrin are added over the course of 5 hours. The batch is refluxed for a total of 40 hours, in the process of which the following amounts of tin tetrachloride are necessary to combine all the epichlorohydrin additively:

| ml SnCl$_4$ | after hours |
|---|---|
| 2 | 15 |
| 2 | 17 |
| 5 | 20 |
| 5 | 24 |

The epoxide value of the reaction mixture has thereupon fallen to 0.11 val./kg, which indicates the virtual quantitative addition of the epichlorohydrin. The reaction mixture is processed in the same way as described in Example 6 A (c) to give 691 parts of a brown resin with an epoxide equivalent weight of 285 and a chlorine equivalent weight of 174, corresponding to a chlorine content of 20.4%.

B. Manufacture of cross-linked polyethers which contain ionic bonds

In the following five experiments, the process analogous to that of Example 1b is carried out. The more precise methods, the starting products used and the amounts thereof and the results are illustrated in Table 1.

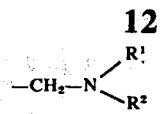

in which $R^1$ and $R^2$ are identical or different and denote a saturated or unsaturated hydrocarbon radical with 1 to 4 carbon atoms or together denote the morpholino radical (such phenols being Mannich bases), are reacted with compounds (B) which contain at least one Cl or Br or I atom bonded to a hydrocarbon radical and at least one 1,2-epoxide group, with addition of the 1,2-epoxide groups to the phenol groups and with quaternization of the halogenated hydrocarbon radicals with the radicals of the formula I, and optionally with organic compounds (C) which contain at least one Cl or Br or I atom bonded to a hydrocarbon radical, with quaternizaton of the halogenated hydrocarbon radicals with the radicals of the formula I, optionally in the presence of water or organic solvents at temperatures of 20° to 200°C.

2. A process according to claim 1, wherein polynuclear phenols (A) are reacted with compounds (B).

3. A process according to claim 1, wherein the polynuclear phenols (A) are reacted with the compounds (B) and optionally with the organic compounds (C) in a ratio such that in the reaction mixture there are 0.5 to 2 epoxide groups per one phenolic group and 0.5 and 1.2 halogen atoms per one tertiary amino group of the formula I.

4. A process according to claim 1, wherein it starts from a reaction mixture which in addition to the polyhydric phenols (A) (Mannich bases) also contains compounds (B) and organic compounds (C).

5. A process according to claim 1, wherein divalent phenols are used as polyhydric mononuclear or polynuclear phenols (A).

6. A process according to claim 5, wherein com-

Table I

| Example No. | Mannich base (A) Type | Mannich base (A) Amount (parts) | Chlorine-containing compounds (B) Type | Chlorine-containing compounds (B) Amount (parts) | Bisphenol-A epoxide resin (epoxide content app. 5 eq./kg) | Gelation hrs | Gelation °C | Curing hrs | Curing °C | Flexural strength kg/mm$^2$ | Impact strength kg/cm |
|---|---|---|---|---|---|---|---|---|---|---|---|
| 6 | manufactured acc. Example 6 A a | 52.8 | manufactured acc. Example 6 A c | 39.8 47.4 | 7.4 parts | 2 | 100 | 12 | 140 | flexible flawless solid body | Flexible, flawless solid body |
| 7 | manufactured acc. Example 6 A b | 49.7 | manufactured acc. Example 6 A d | 47.4 | 2.9 parts | 2 | 100 | 12 | 140 | 8.2 | 4.0 |
| 8 | manufactured acc. Example 6 A b | 49.1 | manufactured acc. Example 6 A d | 35.4 | 15.5 parts | 2 | 100 | 12 | 140 | 21.0 | 3.3 |
| 9 | manufactured acc. Example 6 A b | 50.1 | manufactured acc. Example 6 A c | 49.9 | — | 2 | 100 | 12 | 140 | 5.8 | 3.2 |
| 10 | tridimethyl- aminophenol | 32.6 | manufactured acc. Example 6 A c | 67.4 | — | 2 | 100 | 12 | 140 | 7.1 | 2.0 |

What we claim is:

1. A process for the manufacture of crosslinked macromolecular polyethers containing ionic bonds, wherein polyhydric mononuclear or polynuclear phenols (A) which possess, as substituents in the o- or p-positions to the OH groups, a total of at least 2 radicals of the formula I pounds of the formula II

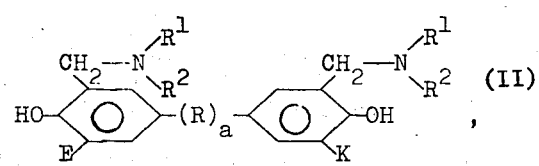

wherein E and K are the same or different and represent either hydrogen or the radical of the formula I, in which a is 0 or 1 and in which R represents one of the divalent radicals

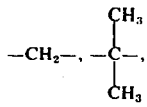

—SO—, —SO$_2$— or —CO— are used dihydric phenols (A).

7. A process according to claim 6, wherein there are used compounds of the formula II, in which a is 1 and R represents

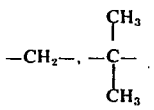

or —SO$_2$—.

8. A process according to claim 7, wherein 2,2',6,6'-tetrakis(dimethylaminomethyl)bisphenol A is used as the dihydric phenol (A) of the formula II.

9. A process according to claim 1, wherein halogenoalkyl glycidyl ethers are used as compounds (B).

10. A process according to claim 1, wherein epoxyhalogenoalkanes are used as compounds (B).

11. A process according to claim 10, wherein epihalogenohydrins are employed as compounds (B).

12. A process according to claim 11, wherein epichlorohydrin is used.

13. A process according to claim 1, wherein polyepihalogenohydrins which contain at least one terminal epoxide group and have a degree of polymerisation of about 3 to 500 are used as compounds (B).

14. A process according to claim 1, wherein substances which have been manufactured by addition reaction of monohydric or polyhydric alcohols or phenols with more than stoichiometric amounts of epihalogenohydrin in the presence of Friedel Crafts catalysts and subsequent dehydrohalogenation, and which have the general formula (III)

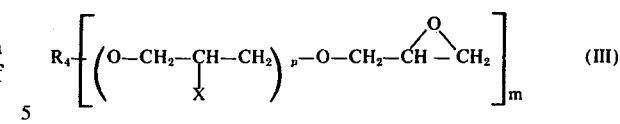

in which R$^4$ denotes a m-valent aliphatic or aromatic radical, X denotes Cl, Br or I, m denotes an integer from 1 to 6 and p denotes an integer from 1 to 20, are used as compounds (B).

15. A process according to claim 14, wherein an addition product of pentaerythritol and epichlorohydrin or an adduct of 2,2',6,6'-tetramethylol-cyclohexanol-1 and epichlorohydrin is used as the substance of the formula III.

16. A process according to claim 1, wherein substances which contain one Cl or Br or I atom and one epoxide group in the molecule are used as compounds B.

17. A process according to claim 1, wherein halogenoalkanes or halogenoalkenes containing at least 1 halogen atom and 2 to 18 carbon atoms are used as organic compounds C.

18. A process according to claim 17, wherein halogenoalkanes or halogenoalkenes with terminal halogen atoms are used.

19. A process according to claim 1, wherein polyepihalogenhydrins with a degree of polymerisation of 3 to 500 are used as organic compounds C.

20. A process according to claim 1, wherein polyaddition products of epihalogenohydrin and polyhydric alcohols or halogen-free 1,2-epoxide compounds are used organic compounds C.

21. A process according to claim 1, wherein carbocyclic or heterocyclic compounds in which the halogen atoms are bonded to the ring directly or via an alkylene group with 1 to 4 carbon atoms are used as organic compounds C.

22. A process according to claim 1, wherein organic compounds containing at least one Cl or Br atom are used as compounds C.

23. A process according to claim 1, wherein organic compounds containing 2 Cl or Br or I atoms are used as compounds C.

24. A process according to claim 1, wherein especially if a less than equivalent amount of epoxide groups of the compounds B is present relative to the phenolic OH groups of the phenols A, 1,2-epoxide compounds D are added before, during or after the reaction of A, B and optionally C to bring about the equivalence, and are reacted.

25. Crosslinked macromolecular polyethers, containing ionic bonds, manufactured according to the process of claim 1.

* * * * *